United States Patent [19]

Spaur et al.

[11] Patent Number: 5,732,074
[45] Date of Patent: Mar. 24, 1998

[54] MOBILE PORTABLE WIRELESS COMMUNICATION SYSTEM

[75] Inventors: Charles W. Spaur; Michael F. Braitberg; Patrick J. Kennedy; Lester B. Hatcher, all of Boulder, Colo.

[73] Assignee: CellPort Labs, Inc., Boulder, Colo.

[21] Appl. No.: 586,602

[22] Filed: Jan. 16, 1996

[51] Int. Cl.$^6$ .................................................. H04M 11/00
[52] U.S. Cl. ............................ 370/313; 370/401; 455/457
[58] Field of Search ................................ 370/310, 313, 370/328, 401; 455/33.1, 49.1, 53.1, 54.1, 99, 457, 404, 577, 563; 379/58, 59, 63

[56] References Cited

U.S. PATENT DOCUMENTS

| | | | |
|---|---|---|---|
| 5,333,177 | 7/1994 | Braitberg et al. | 379/59 |
| 5,442,633 | 8/1995 | Perkins et al. | 370/94.1 |
| 5,459,660 | 10/1995 | Berra | 364/424.03 |
| 5,479,479 | 12/1995 | Braitberg et al. | 379/58 |
| 5,515,043 | 5/1996 | Berard et al. | 340/988 |
| 5,519,621 | 5/1996 | Wortham | 364/460 |

*Primary Examiner*—Chau Nguyen
*Attorney, Agent, or Firm*—Sheridan Ross P.C.

[57] ABSTRACT

Communication of information including data between a remote computer and a vehicle is managed and facilitated using an apparatus compatible with standardized network communication links. In one embodiment, the standardized network communication links include the Internet and a controller area network used in vehicles. The apparatus preferably includes a controller contained in the vehicle. The controller is comprised of a number of hardware and software elements including a processor. A TCP/IP stack is part of the controller for providing the necessary control in checking for communicating information, such as requests and data, over the Internet. A web server communicates with the TCP/IP stack for servicing information related requests in http format including obtaining or sending information in operative communication with the TCP/IP stack. A CGI-bin (common gateway interface-binary) communicates with the web server and acts as a link to executable software stored in program memory that is responsive to user requests. A data memory is also available for storing data in html that is accessible by the web server. A real time operating system (RTOS) is involved in task and memory management as part of the responding to requests for information. The controller is able to receive requests using a wireless device when it is in the vehicle and through a communications port when the wireless device is not in the vehicle. In another embodiment, each of the plurality of vehicle devices has an Internet address or designation associated with it.

21 Claims, 4 Drawing Sheets

MOBILE PORTABLE WIRELESS COMMUNICATION SYSTEM

FIELD OF THE INVENTION

The present invention relates to bi-directional communications over an airlink and, in particular, information transfers between a vehicle and one or more remote stations using an established network, such as the Internet.

BACKGROUND OF THE INVENTION

Establishing communications with vehicles that are commonly found at different locations or are in transit between locations has become increasingly more important. It is often desirable to know the location of a particular vehicle at a given time. Such a vehicle may be transporting goods that the recipient is waiting for and wishes to know the current location of the vehicle transporting the goods. It may also be useful to monitor conditions of the goods, such as the temperature of refrigerated loads. In addition to goods carried by the vehicles, the vehicles themselves can be monitored for certain conditions, such as engine or other parameters. Such information can be utilized in insuring that the vehicles are properly maintained to avoid vehicle downtime or the necessity of road service. Other applications involving communications with vehicles might involve safety and security considerations. A monitored vehicle can include an emergency vehicle that transports a patient who is connected to monitoring equipment in the vehicle that continuously or periodically gathers patient data. During transport of the patient, such patient data can be communicated to medical personnel at a remote location, such as a hospital, to prepare for the arrival of the patient. When the patient arrives, this data has been evaluated and decisions reached as to how best to care for the patient. Other security or safety checks might include: whether a vehicle door was unlocked, initiation of an alarm by activating a switch, automatic indication of an airbag detonation and automatic generation of a signal when an expected input has not been received for a certain amount of time.

With regard to requesting and obtaining such data from vehicles in connection with different vehicle related applications, substantial impediments are encountered. Specifically, no universal system or package is available that is configured to operate with vehicles from which information may be sought by multiple users having different objectives or applications. Typically, users have different computer hardware and telecommunications equipment, as well as software for their particular jobs or applications. With respect to the vehicle itself, and depending upon the desired applications of a particular user, data to be gathered has to be obtainable from a potentially large number of physical devices. Given such a broad spectrum of actual and potential applications and available devices and equipment, an appropriate and effective linkage must be provided to enable accurate and efficient communication to occur between the remote station and the vehicle. In light of the mobile nature of the vehicle, part of the communication must occur wirelessly over an airlink. Achieving desired communications with vehicles also requires the flexibility to adapt to changing applications associated with vehicle related information being sought, including physical devices that might be modified or added at later times, as well as accommodating new users with different physical devices that may have different information gathering requirements and parameters. Relatedly, multiple users must be able to simultaneously access different information that may require multiple tasks to be performed in the vehicle before such information can be gathered and sent to the remote site. With all these requirements and objectives, the implementation of such a communication system cannot be burdensome, nor be prohibitively costly. Importantly, the communications system and processing capability must be portable and practical for the vehicle environment, as well as involving protocols that a variety and large number of users are familiar with.

SUMMARY OF THE INVENTION

In accordance with the present invention, a system is provided in which communication of information, including requests, commands and data, is achieved between vehicle having physical vehicle devices and one or more sites that are remote from the vehicle. The information communication is implemented using certain standardized network communication links that enable multiple users, either simultaneously or at separate times, with different communications and processing hardware, software and different applications and requiring information from different vehicle devices, to obtain the desired information while avoiding design complexities in interfacing the remote site with the vehicle devices.

The system includes, at the remote site, a computer terminal which can be a conventional PC with a modem. The computer terminal is able to communicate with a first standard communications network link, such as the Internet, through its modem. An internet or a world wide web browser, for example, that is available to the computer terminal is accessed. The computer terminal supplies the browser with an IP (Internet protocol) address. This IP address is associated with a particular vehicle including communications related hardware contained in the vehicle. Typically, the IP address is accompanied by a request or command for information or data that is available from the particular vehicle. In addition to this first standardized communications network, since bi-directional communications involving a vehicle are conducted wirelessly for at least a portion of the communications link, it is necessary for the Internet to communicate with an appropriate interface or network that wirelessly links with the vehicle. In one embodiment, the cellular digitized packet data (CDPD) network provides the desired link including arrangement of information being communicated and where the destination site, namely the particular vehicle, is found in the network. If a channel is available to the particular vehicle, the CDPD link can proceed to transmit the Internet packets to the vehicle of interest. Instead of the CDPD network as the link, a communications interface could be employed that involves data only, such as a two way paging interface with the vehicle.

With respect to handling requests, commands and information including data transfers relative to the vehicle, particularly involving data from vehicle devices, certain hardware and software is contained in the vehicle. For receiving information from the Internet, a wireless device, such as a cellular phone, having the appropriate hardware and channels acts as a receiver for such information in combination with an appropriate airlink modem, such as a CDPD network modem. The wireless device is contained within the vehicle and communicates with a controller through a phone interface. The phone interface provides the necessary electrical signal connections between the output lines or channels from the wireless device and the controller inputs.

The controller is also found in the vehicle and is a key unit of the apparatus and includes a number of hardware and software elements. Specifically, a TCP/IP (transmission control protocol/Internet protocol) stack acts on a received request or command by performing a number of functions. The received request has a IP address associated with it and a check is made as to whether or not the request has the correct address. Further, the formatted data is checked for accuracy. The TCP is responsible for controlling the structure and flow of the received information. In that regard, the TCP/IP stack is associated with a number of sockets that it communicates with or links to, with the selected socket being dependent upon the content of the received information. In that regard, among the sockets available to the TCP/IP stack is a server. In conjunction with effectively communicating over the Internet, an http (hypertext transmission protocol) web server is utilized. The web server operates in accordance with world wide web protocol and services information related requests in http format including obtaining or getting information based on a received request or command and sending or posting information in response to received requests or commands. The controller also includes data memory for storing data in html (hypertext markup language) format, with such data being frequently previously collected from vehicle devices and stored in the data memory. In response to a request, for example, the web server accesses the data memory to obtain desired data and encapsulates it in accordance with http format for transmission from the controller through the wireless device using an appropriate airlink modem to a destination site (remote station).

The web server also communicates with a CGI-bin (common gateway interface-binary), which is also part of the controller. The CGI-bin is useful in linking the web server with a number of executable programs stored in a program memory. These executable programs can be utilized in obtaining or providing data or other information associated with the vehicle devices. In one embodiment, one or more executable programs are run to obtain data which is then stored in data memory in html format for later access and use, including transmitting such data to a remote site. The controller also has a real time operating system (RTOS) that typically is involved with managing a number of services associated with conducting one or more applications oriented tasks. For example, the RTOS works with the applications software during execution for managing tasks that are run by the applications software and management of data stored in the file memory. Especially in the context of a vehicle, the executable software might include a variety of applications including: the present location of the vehicle; vehicle maintenance monitoring parameters, such as status conditions associated with the engine, coolant status, oil pressure and battery life; cargo conditions including status of delivery of cargo and relevant cargo conditions, such as temperature; alarm conditions that apprise others of certain predetermined events associated with the vehicle, such as airbag detonation; and, in the case of a vehicle transporting a patient, monitoring data associated with patient vital signs.

With regard to obtaining information or data from these vehicle devices for appropriate processing using, for example, one or more executable programs in the program memory, the controller communicates with a second standardized network in the form of a network that is commercially available and used in vehicles, such as the previously devised controller area network (CAN). The CAN is operatively connected to each of a plurality of vehicle devices that transmit, receive, or both transmit and receive desired data. For example, the vehicle devices include transducers or other physical devices that detect and provide information useful to applications software for processing to obtain information that is then transmitted, for storing in memory for later transmission, or even for immediate transmission without processing, upon receipt of the proper request or command. Other available networks could be utilized, instead of the CAN, such as Arcnet, which has a protocol similar to CAN.

More specifically, with respect to transmission of information from the controller through the wireless device to a remote site, after receipt of a request as previously described and in accordance with one procedure, the web server interprets the transmitted request and determines that certain data stored in the data memory is being requested by a user at the remote site. The stored data is accessed and prepared by the web server in accordance with http format for transmission over the Internet. The http formatted information is subject to the operation of the TCP/IP stack for regulating the transmission of the requested information including associating a destination IP address with the information being sent. Once the information is properly prepared using the TCP/IP stack, it can be sent over the airlink via the wireless device to the Internet connection using appropriate airlink modems.

In a variation of this operation, instead of a request starting from the remote station, the sending of information including data might be initiated in the vehicle. By way of example, it may be necessary or desirable that certain data parameters be periodically transmitted to a remote station for analysis or other considerations. In still another operation variation, an additional information transmission can be received from another user located at a different remote site during the time that a first request for information is being processed by the controller. In such a case, the TCP/IP stack, in conjunction with the operating system, enables multiple tasks to be performed in a controlled manner so that more than one user is able to communicate with the controller at the same time.

Preferably, the controller in the vehicle is also associated with an interface for communication with one or more available systems, such as an RS232 connection, an Ethernet connection and/or a PCMCIA unit. In a related embodiment, the controller includes a direct communications port for receiving and sending information without requiring the wireless device and the Internet connection to the wireless device. In this embodiment, the direct communications port receives information or data using another source contained in the vehicle, such as the vehicle's radio. Subcarrier information is transmitted to the radio and decoded for input to the direct communications port for subsequent analysis or use by the CAN. In yet a further variation of controller operation, each vehicle device on the CAN has its own IP designation or address so that the remote user can utilize this designation or address for communication with the selected vehicle device having that designation or address. The controller uses the received IP address or designation for the particular device and acts as a link or bridge for the remote user to the particular device.

Based on the foregoing summary, a number of salient features of the present invention can be readily identified including the substantial elimination or avoidance of numerous, different and complex hardware and software for communicating information involving physical devices located in a vehicle and one or more computers located at one or more remote sites. A combination of controller related components are containable in a vehicle for responding to requests from remote sites, obtaining and storing information associated with vehicle devices and running executable software that may be available in the program memory of the controller or downloaded from the remote site, while handling and configuring information including data that is communicative with the remote site over an established network, such as the Internet. Furthermore, the controller efficiently communicates with another standard network found in a vehicle, such as the controller area network, to obtain data from the vehicle devices and, when appropriate, send messages or information to the vehicle devices. The controller elements are important in communicatively linking together previously incompatible remote and vehicle networks to achieve a functional mobile communication system. The overall system including the standardized networks effectively enables, either substantially simultaneously or separately, a variety of applications to be performed by multiple users and which applications utilize one or more of a large number of selectable and different vehicle devices, while not requiring substantial allocated memory in the vehicle.

Additional advantages of the present invention will be readily understood from the following discussion, particularly when taken together with the accompanying drawing figures.

DETAILED DESCRIPTION

Figure 1:
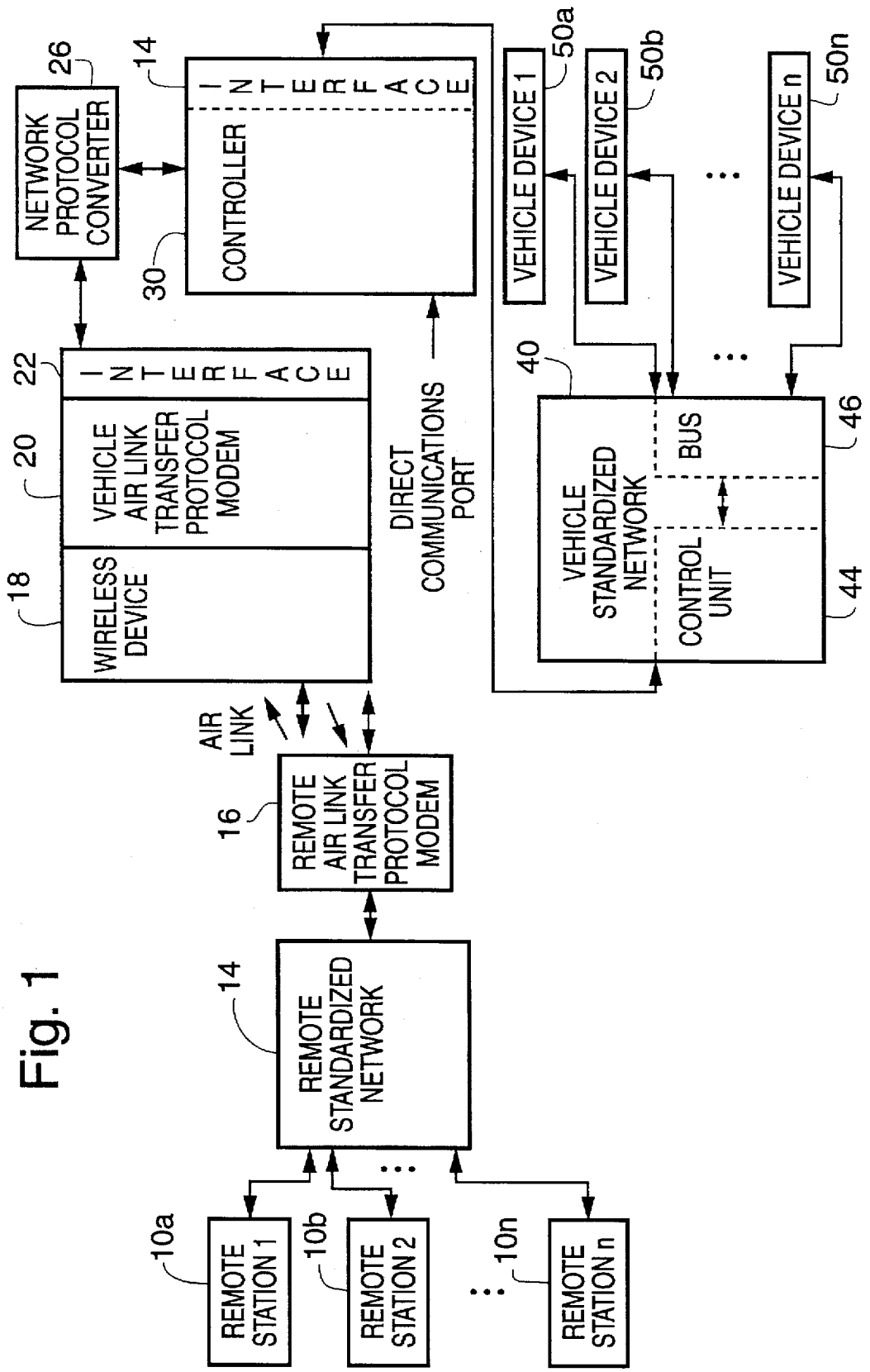
FIG. 1 is a block diagram illustrating the general components of the apparatus for information communication between one or more remote stations and a vehicle.

With reference to FIG. 1, an apparatus is illustrated in the block diagram for bi-directional communication between one or more remote stations 10a–10n and a vehicle. The bi-directional communication has the capability of involving multiple users and a number and variety of applications that are germane to the vehicle. Each remote station can include communications and processing related hardware and software that is different from that of the other remote stations. To avoid extensive and customized hardware and software in order to achieve the desired bi-directional communications, a standardized remote network communications link 14 is utilized. That is, each user who wishes to communicate with the vehicle, need not develop and establish the necessary interfacing networks and protocols for communication with the vehicle. Each user, including users who operate independently of other users, is able to access the vehicle through the same standardized remote network communications link 14, regardless of the particular application or applications that the user has for implementation or operation in conjunction with hardware and software associated with the vehicle. In a preferred embodiment, the remote network communications link 14 is the Internet. With respect to communication with a vehicle, the information being communicated must be configured or formatted in a way that achieves proper communication over an airlink to the vehicle. This is accomplished using a suitable switching station identified generally as a remote airlink transfer protocol modem 16. In one embodiment, the communication information is formatted in accordance with a CDPD (cellular digitized packet data) configuration. At the vehicle, this information is received by a wireless device 18 that is able to transmit and receive information via the airlink. The wireless device 18 is operatively associated with a vehicle airlink transfer protocol modem 20 for the proper handling of the airlink formatted transmission. In one embodiment, the wireless device 18 includes a cellular phone that is selected from a plurality of conventional or commercially available cellular phones. The wireless device 18 bi-directionally communicates with a controller 30 contained in the vehicle through a network protocol converter 26 using a wireless device interface 22. The wireless device interface 22 establishes the necessary signal compatibilities and connections from the wireless device 18. The network protocol converter 26 removes or otherwise converts the inputted information to a form that is acceptable to the controller 30 or, alternatively, information is made compatible with the remote airlink transfer protocol modem 16 when such information is sent through the airlink using the network protocol converter 26. In conjunction with the FIG. 1 illustration, the network protocol converter 26 is essentially part of the wireless device 18 and physically separated from the controller 30 but electrically connected thereto so that no network protocol converter is required in the controller 30. In the embodiment to be described in greater detail herein, the network protocol converter 26 includes a TCP/IP stack which can be part of the controller 30 so that the controller 30 is also definable or can be referred to as a controller/network protocol converter 30. The controller 30 is responsible for a number of functions related to understanding and acting on information received from one or more remote stations 10, obtaining and responding to requested information and operatively functioning with information including data available from other elements in the vehicle. In that regard, the controller 30 communicates with a controller interface 34 that electrically links the controller 30 with a vehicle standardized network 40. The vehicle standardized network 40 includes a controller unit 44 that provides appropriate message and data handling functions associated with sending and receiving information including data from each of a plurality of physical vehicle devices 50 that are operatively connected to a bus 46 of the vehicle standardized network 40. Like the remote standardized network 14, the vehicle standardized network 40 is an established and previously developed network that interfaces with components in a vehicle, such as engine related components in order to provide desired or requested data concerning the operations or status of these components. An important aspect of the apparatus of the present invention involves the enabling of communications between two mutually incompatible and highly dissimilar standardized networks. More specifically, full communication capabilities are achieved among numerous remote stations via a global or remote standardized network and vehicle devices via a localized standardized network, either at different or at the same times, using the apparatus even though the global and localized networks are configured substantially differently and involve significant protocol and environmental differences. That is, the remote standardized network 14, such as the Internet, is configured as an information communications system having no geographic boundaries. The vehicle or localized standardized network 40 is designed to function properly in the electrically noisy and otherwise hostile vehicle environment. The diverse design objectives and problems faced by these two different standardized networks therefore requires a communications related apparatus that is able to effectively enable these two networks to bi-directionally communicate with each other, as well as other hardware and software that is operably connected to the two standardized networks. In accordance with the present invention, the vehicle devices 50 might include a large number of diverse devices, including common vehicle parts or components, for providing and receiving information including data, as well as, in some cases, acting on such information by analyzing or processing such information. With regard to providing information to a remote station 10, a substantially symmetrical relationship exists among the elements of FIG. 1. That is, the controller 30 is able to prepare information for sending to a remote station 10, including data or other information available from one or more of the vehicle devices 50 using the vehicle standardized network 40. Such information is sent to the wireless device 18 through its interface 22 for transmission using the vehicle airlink transfer protocol modem 20 over the airlink to the remote station 10 by way of the remote standardized network 14 in combination with the remote airlink transfer protocol modem 16.

Figure 2:
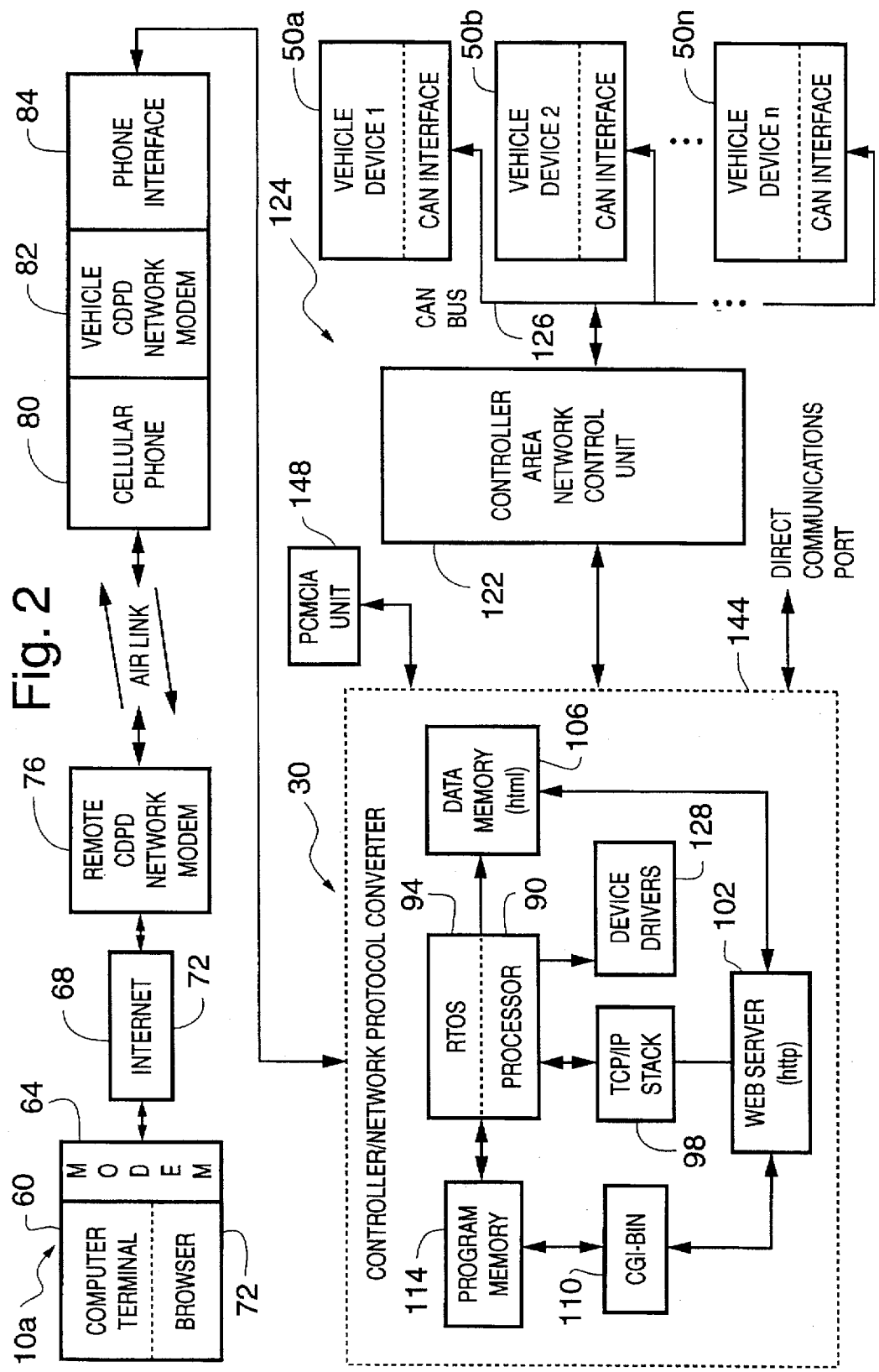
FIG. 2 is a more detailed block diagram illustrating major elements of the controller.

With reference now to FIG. 2, greater details of the apparatus of FIG. 1 are illustrated, particularly key elements of the controller 30 contained in the vehicle. As shown in FIG. 2, remote station 10a is illustrated and it includes a computer terminal 60. In one embodiment, the computer terminal 60 is a conventional PC having the usual hardware and software components and capabilities including input and output devices, such as a keyboard, mouse and terminal display screen. The computer terminal 60 communicates with a modem 64 in order that the information from and to the computer terminal 60 can be sent over conventional communication lines, such as telephone lines. In the preferred embodiment, the modem 64 enables the computer terminal 60 to communicate with Internet 68. In one embodiment, the computer terminal 60 has one or more browsers 72 available to it, which is used in requesting or responding to information communications involving a particular vehicle. The Internet 68 operatively communicates with a standardized network transmission protocol that permits information to be bi-directionally communicated over the airlink and, in one embodiment, includes a remote CDPD network modem 76 which prepares the information in a conventionally acceptable manner for transmission and communication with a cellular phone 80 which is contained in the vehicle. The cellular phone 80 can be any selected one of a number of conventional cellular phones that have the capability of properly communicating with the desired formatted or arranged information. In the illustrated embodiment of FIG. 2, the cellular phone 80 is operatively associated with a vehicle CDPD network modem 82 that demodulates the received information so that it is acceptable for further handling or processing. A phone interface 84 links the cellular phone 80 with the controller 30 and is, preferably, configured to work with a variety of cellular phones having differing output connections and/or arrangements of output connections. In that regard, the phone interface 84 is useful in providing a proper battery charging function for the cellular phone 80, assisting in the identification of the particular cellular phone 80 that is being utilized, and establishing the correct electrical connections for passage or communication of the signals between the cellular phone 80 and the controller 30. An appropriate phone interface 84, or at least portions thereof, is disclosed in U.S. Pat. No. 5,333,177 issued Jul. 26, 1994 and entitled "Universal Connection for Cellular Telephone Interface."

As also seen in FIG. 2, the controller 30 includes a number of elements for handling the functions and responsibilities associated with responding to messages, such as requests or commands, from one or more of the remote stations 10, running executable software and obtaining data, as well as achieving the necessary communications protocols with the Internet 68. The controller 30 includes a processor 90 for performing processing operations including running of executable program code, including in the context of utilizing or incorporating data that the controller 30 has access to. Preferably, the processor 90 is a single microprocessor that performs multiple tasks, in conjunction with a real time operating system (RTOS) 94. That is, the RTOS 94 manages a number of services associated with conducting one or more applications oriented tasks. Preferably, the RTOS 94 includes a kernel that is involved in performing real time multi-tasking including: task management, intertask communication, memory management, message management, timing, I/O management and error management. In the context of applications associated with the vehicle, the RTOS 94 works with applications software in a multi-task scheme to respond to requests for vehicle related information including data.

The controller 30 also includes a TCP/IP (transmission control protocol/internet protocol) stack 98 for providing necessary communication protocols in association with the Internet. The TCP regulates the flow and structure of data or other information including an operative communication with a web server 102. The IP is responsible for recognizing source and destination addresses in connection with insuring receipt at the proper location, as well as checking for the accuracy of data packets received from the airlink. The TCP/IP stack 98 is invoked initially when information is received by the controller 30 and is invoked when information including data is to be outputted from the controller 30 to the phone interface 84. Preferably, the TCP/IP stack 98 is a commercially available portable unit for an embedded system that provides a single threaded stack for supporting multiple sockets including sockets associated with the web server 102. The web server 102 services information related requests in http (hyper text transmission protocol) format. These requests include obtaining or getting information, as requested, and the sending or posting of information, as requested. The web server 102 is also a commercially available Internet related product. With respect to getting information, the controller 30 further includes a data storage unit or data memory 106. Generally, the data memory 106 stores data that has been generated and is expected to be useful in handling requests or commands. Such data may be data obtained from monitoring a physical device associated with a vehicle and/or may include data useful in running executable software that is intended to provide further information or data useful to a requestor. The data in the data memory 106 is preferably configured in html (hyper text markup language). In this configuration, the web server 102 is able to access the data memory 106 and obtain such configured data for encapsulation or incorporation in the http format for communication over the Internet 68. In addition to communication with the data memory 106, the web server 102 is operatively linked to a CGI-bin (common gateway interface-binary) 110. The CGI-bin 110 acts as a link or a gate to a number of typically short executable programs stored in program memory 114. Such stored executable software may encompass a variety of applications associated with the vehicle. Generally, such software is useful in processing, analyzing or otherwise acting on data available in the vehicle, including acting on the data in real time, such as acting on available data in real time that is used for transmission to a remote station, where such transmission is initiated in the vehicle. A representative listing of applications is as follows:

(a) monitoring of vehicle locations and status;
(b) tracking of deliveries of packages by the vehicle;
(c) monitoring cargo conditions in the vehicle, such as the temperature of the cargo and checking equipment related to maintaining a desired temperature;
(d) vehicle parameter monitoring for maintaining the vehicle such as checking engine conditions including possibility of overheating and operating mileage (odometer reading);
(e) displaying of directions and/or dispatch instructions; and
(f) communication of short messages between a user at the remote site and the operator of the vehicle.

In addition to application software that might be involved with such functions, the short programs in the program memory 114 may include software related to safety and security considerations, including:

(a) monitoring a patient's vital signs who is being transported by the vehicle;
(b) providing information as to whether or not a roving security vehicle has periodically checked in with a home base; and
(c) providing an indication of key or alarm related events, such as when roadside assistance is required, the vehicle or the driver of the vehicle faces a threatening situation, an unauthorized vehicle door unlocking and/or initiating an automatic call for assistance in light of an airbag detonation.

With regard to representative operations, the data memory 106 may store page information that is accessible by the web server 102. Upon receipt of a command or request, this page information may be accessed and updated with current data or other information for transmission to a user at a remote station 10. For example, page information may require that data, which is collected from the vehicle devices 50, be inserted or be included therein. In a variation of this operation, all or substantially all of the page information is generated after receiving a request for information that is associated with the page. In generating the page information, data already stored in the data memory 106 may be utilized or, alternatively, data may be obtained upon receipt of the request from the physical devices associated with the vehicle. In a further and related variation, information or executable software may be downloaded from the remote station to the controller 30 for execution as part of responding to an accompanying or future request, which software may be executed in conjunction with the operation of an applet that is stored as part of the controller 30. In such a variation or with other variations, it may be appropriate to maintain memory storage space at a reduced level in the controller 30 so as to keep within defined vehicle cost and space requirements. In a related embodiment, the appropriate information or executable software is already part of the controller 30 and is part of the short programs accessible using the CGI-bin 110.

With continued reference to FIG. 2, a more detailed discussion related to the vehicle devices 50 is provided. Each of the vehicle devices 50a–50n is able to receive information such as data, send information, or is able to both receive and send information. Generally, the vehicle devices 50 can include a variety of monitoring, detecting, inputting or other information communication related devices. In conjunction with the aforedescribed short executable programs that might be available in or to the controller 30, such vehicle devices 50 can include sensors, transducers or other equipment for providing or receiving information. By way of example only, the vehicle devices 50a–50n can include one or more of the following: GPS (global positioning system), dead reckoning sensors, facsimile machine, PDA (personal digital assistant), laptop computer, printer, display unit, modem, CD-ROM unit, storage device, medical condition sensors, vehicle condition sensors, vehicle cargo sensors, airbag sensor and general alarm sensors related to unlocking the vehicle or unwanted intrusion into the vehicle.

In order to provide the necessary communications protocol between the controller 30 and the vehicle devices 50a–50n, another standardized network communications link is provided, which is different from the first standardized network communications link, such as the Internet 68. This further standardized communications network is responsible for handling the communication exchange functions associated with sending and receiving information relative to the vehicle devices 50. In a preferred embodiment, this further standardized network is a network that has been previously devised and is commonly used in a number of makes and models of vehicles. This communications network is defined as the controller area network (CAN) 124. Although the CAN 124 has previously commonly been used in operative association with automotive electronics including engine control elements, sensors, lamps, electric windows etc., the present invention also enables the CAN 124 to be used with a variety of other devices contained in the vehicle, such as the previously described devices. An apparatus that utilizes processing capability in a vehicle with a number of peripheral devices in communication therewith over a common bus is disclosed in U.S. Pat. No. 5,479,479 issued Dec. 26, 1995 and entitled "Method and Apparatus for Transmission of and Receiving Signals Having Digital Information Using an Air Link," and which is assigned to the same assignee as the present application.

Generally, the CAN 124 is definable as being comprised of an object layer and a transfer layer that constitute a CAN control unit 122, and a physical layer. The object layer is responsible for message filtering, and message and status handling. The transfer layer is responsible for confinement of faults, error detection and signaling, message validation, acknowledgements, bus contention, arbitration among information, message framing and transfer rate and timing. The physical layer is the transmission medium itself as well as the signal level and bit representations that are transmitted along the transmission medium. The transmission medium is essentially a multi-conductor bus 126 that has electrical conductors electrically connected to each of the vehicle devices 50 that are on the CAN 124. In operatively connecting the CAN bus 126 to each vehicle device 50a–50n, each of these vehicle devices is operatively associated with a CAN interface. In one embodiment, each of the CAN interfaces is connected in "daisy-chain" fashion as part of the bus 126 configuration. In interfacing with the CAN 124, the controller 30 also has device drivers 128 that are useful in achieving desired communications in both directions between the CAN 124 and the controller 30. For example, the processor 90 is able to obtain data or other information from the vehicle devices 50a–50n using the device drivers 128 and which information can be used by the processor 90 including, for example, storing data in the data memory 106 for subsequent access and transmission to a remote station 10.

As also illustrated in FIG. 2, information can be communicated to the apparatus without passing through the cellular phone 80. A direct communications port 144 is operatively associated with the device driver assembly 128 for communication through the CAN 124 to one or more of the vehicle devices 50a–50n. The direct communications port 144 has particular utility when the cellular phone 80 or other wireless device is not in the vehicle. In that situation, information is communicated using another device or unit in the vehicle. For example, the vehicle radio receives a transmission having a subcarrier signal that conveys information useful to and understood by the hardware associated with the direct communications port 144. The data stream that is inputted to the port 144 was previously obtained or decoded to provide the information in a format compatible with the port 144. Conversely, the port 144 enables information carrying signals to be outputted therefrom for transmission outside of the vehicle, such as again using the vehicle's radio.

In addition to vehicle devices 50 that communicate through the CAN 124, further peripheral devices can be connected directly to the controller 30, instead of communicating through the CAN 124. For example, a PCMCIA (personal computer memory card interface association) unit 148 is electrically connected to the device driver assembly 128. The unit 148 might include a storage device with a disk drive for storing desired information or data. Another such unit 148 might include a modem for providing communication capability directly between the controller 30 and another device or unit in the vehicle.

The description so far has been directed to an embodiment in which the vehicle or the controller 30 is associated with an address that the Internet 68 utilizes in connection with sending information to the vehicle. In another embodiment, each of the vehicle devices 50a–50n has its own IP (internet protocol) address or designation. A user at a remote station 10 that wishes to send or receive information relative to a particular vehicle device 50a–50n, utilizes the IP address or designation of the vehicle device in order to achieve the information transfer relative to the particular vehicle device 50. In this case, the controller 30 and its operation are essentially transparent to a user at a remote site and each vehicle device 50 appears or acts as if it is a TCP/IP device. An example of operation, in accordance with this embodiment, might involve a vehicle device 50, such as a CD-ROM unit. Specifically, the user or accessor of the CD-ROM unit provides an IP address for this device and it is received by the vehicle having the CD-ROM unit. The controller 30 recognizes this IP address and is able to provide the requested link to the CD-ROM unit through the CAN 124. As a possible variation or addition to such an operation, the controller 30 can include an applet that is associated with this IP address. When this IP address for the CD-ROM unit is recognized by the controller 30, the controller 30 sends the applet to the user accessing the Internet 68, where the applet is received by the browser 72. The browser 72 uses the applet to bring up a display using the computer terminal 60. The display might include, for example, buttons that represent CD-ROM unit controls that the user can "click on" to cause certain operations associated with the CD-ROM unit.

In further related methods of operation when an http request is received by the web server 102, the controller 30 is able to respond in a dynamic manner to reflect the current status or conditions of vehicle devices 50. By way of example, as just noted, when all vehicle devices are properly functioning and providing data, an html page including one or applets could be downloaded to handle such data from the controller 30. However, if one or more vehicle devices are not producing accurate data, a determination might be made to modify the content or number of applets that are usually downloaded in connection with such data when it is accurate. This reduces the magnitude and time of transmission, which results in a decrease in the cost of the wireless transmission, especially where there is a substantial amount of data, a large number of vehicles and/or an expected transmission on a very regular basis. As an additional example, the controller 30 might utilize information including data from a group of vehicle devices that is to be served to an applet embedded in a page. In a case in which one or more vehicle devices are not properly functioning or not functioning at all, the quality of information produced by the embedded application varies and is not reliable. Thus, it would be useful to be able to alter the presentation of this information in a dynamic manner. That is, such a presentation should reflect accurate data and the controller 30 is able to make a determination as to what information or data should be presented when such situations arise.

In yet a further related method of operation, the controller 30 is able to provide information by way of one or more notifications to one or more stations when a particular event or condition occurs such as at a predetermined time interval after the event or condition arises. In one embodiment, a worldwide web browser operably connected to the web server 102 selects the events or conditions to which the predetermined actions are to be taken by the web server 102. For example, a user may request a notification message when the vehicle reaches a certain location, when a sensor in the vehicle measures a value relative to a predetermined threshold value and upon the occurrence of other predetermined events or conditions. Such request for notifications may be formulated via a point-and-click worldwide web browser interface and notifications can be made to frames on a web page, or other appropriate ways specified by the user. The user could also specify in the request that the notifications are to be sent to a third party by way of E-mail or http/html messages. By such techniques, notifications can be sent to a list of locations in electronic format suited for each individual location.

Figure 3:
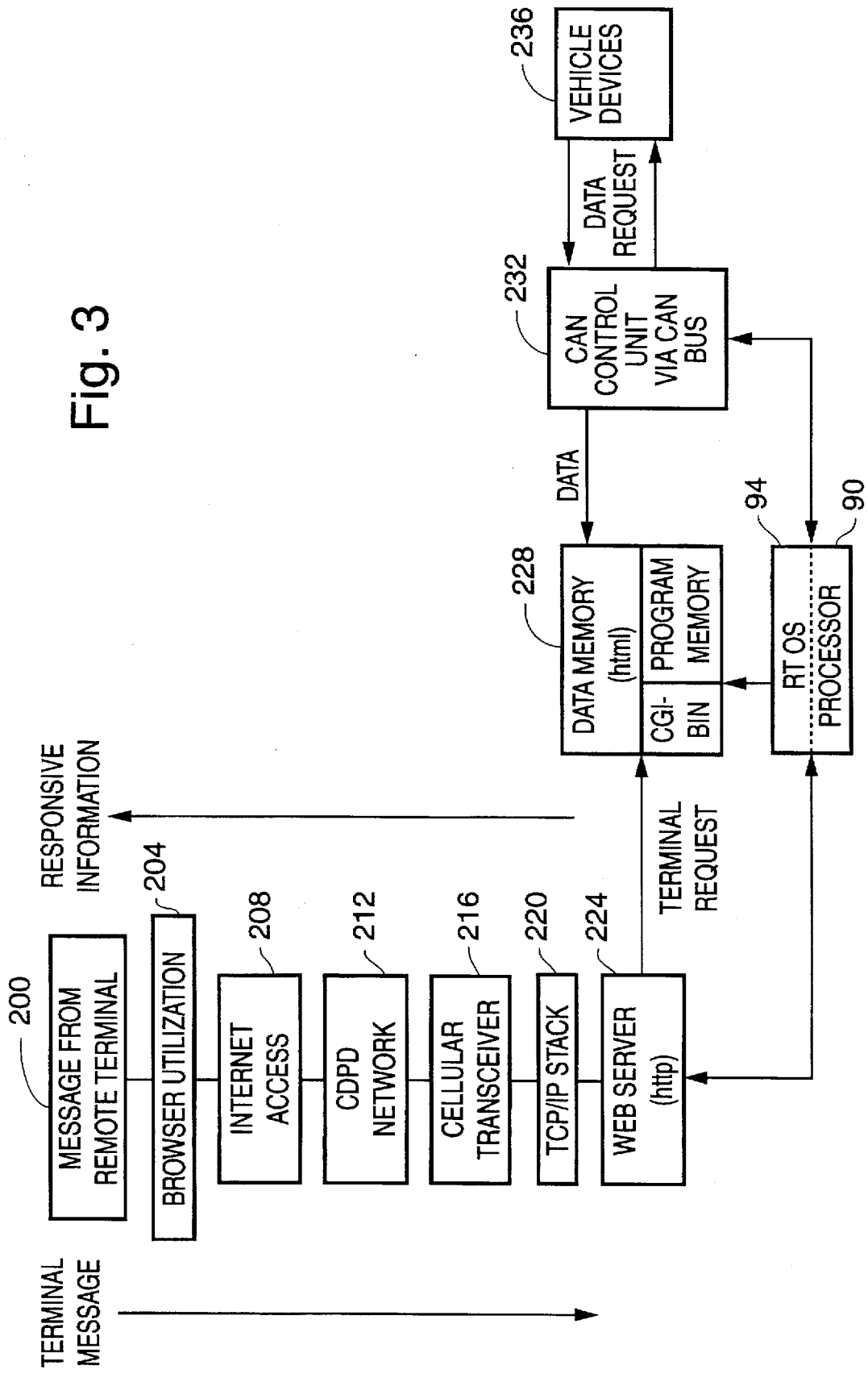
FIG. 3 is a flow diagram illustrating major steps that are involved in the bi-directional communications between one or more remote stations and a vehicle having the controller in which a message is initiated from the remote station.

With reference to FIG. 3, the operation of the present invention is further described in the context of a flow diagram illustrating steps for transmitting and receiving information between a computer terminal 60 and a vehicle of interest. In particular, the user inputs a message at the computer terminal 60, in accordance with block 200. The message includes at least an IP address and a request for information that is obtainable from the subject vehicle. The message is transmitted via the modem 64 connected to the computer terminal 60 utilizing the browser 72 at block 204 to direct or route the host message in accordance with the IP address. At block 208 the Internet 68 is accessed for carrying the message. As part of the message transmission, the remote CDPD network modem 76 is employed at block 212 to packetize the data message so that it can be properly transmitted over the airlink. At block 216, the CDPD transmitted message is received by the cellular phone 80 or other transceiver and the output thereof is gated to the controller 30 having the TCP/IP stack 98 at block 220 after the message is demodulated by the vehicle CDPD network modem 82. The IP checks the accuracy of the identified address and other information in the message. The TCP coordinates the flow of the message and prepares it for transmission to the http web server 102 at block 224. The web server 102 under the control and process functioning of the RTOS 94/processor 90, services the information related request in http format. In accordance with one example, the message includes a request for vehicle information related to engine and/or other vehicle component operations or conditions. In one application, for example, the requested vehicle conditions might have to be obtained from data that is processed or analyzed using executable software or a program stored in the program memory 114. In such a case, a request based on the message is applied to the CGI-bin 110 at block 228. This link enables the desired program to be selected and run under the processing/control of the processor 90/RTOS 94. As part of that execution, it may be necessary to obtain previously stored information including data from the data memory 106 Additionally, or alternatively, it may be necessary to obtain current or other data that is available from a particular vehicle device itself. In that context, the processor 90/RTOS 94 obtains such information through the CAN controller unit 122 via the CAN bus 126 at block 232. The CAN protocol is utilized to request and obtain the data from the selected vehicle device at block 236. The data obtained by the CAN 124 is utilized by the processor 90 in connection with the execution of the selected program that is being executed. In one embodiment, with the requested data related to the vehicle component conditions having been obtained by processing, or from one or more vehicle devices 50, or by both methods, such data can then be included in page information. Portions of the page information could be stored in the data memory 106, with the obtained data being included in the appropriate parts of the page. Once this is completed, the page information is handled by the web server 102 for sending the page information in http format. The TCP/IP stack 98 is involved in the control of the transmission of this page information, as well as checking the destination address. The page information is transmitted through the cellular phone 80 including being packeted for a CDPD network transmission, using the vehicle CDPD network modem 82 for transmission over the Internet 68 to the requesting computer terminal 60. The page information can then be displayed on the display unit of the computer terminal 60.

With regard to operation variations, with respect to one or more alarm conditions, when a particular vehicle device 50 detects or is involved with an alarm event, this is reported by the CAN 124 to the processor 90 using the device drivers 128. The processor 90 and the TCP/IP stack 98 cooperate to send a signal through the cellular phone 80 indicative of this alarm condition, without the need to utilize the web server 102. The signal representative of the alarm condition is properly directed to a predetermined IP address over the Internet 68. Relatedly, the processor 90 is able to execute an appropriate interrupt routine in order to delay or interrupt a response that is being performed due to a currently existing request to the controller 30 in order to process the detected alarm condition. After such processing, the processor 90 can continue with responding to the request that was present prior to the interrupt. Additionally, the controller 30 is able to be responsive to more than one request from different users at different remote stations. The processor 90 and the RTOS 94 cooperate to perform multiple tasks in a coordinated fashion in response to requests from multiple users.

Figure 4:
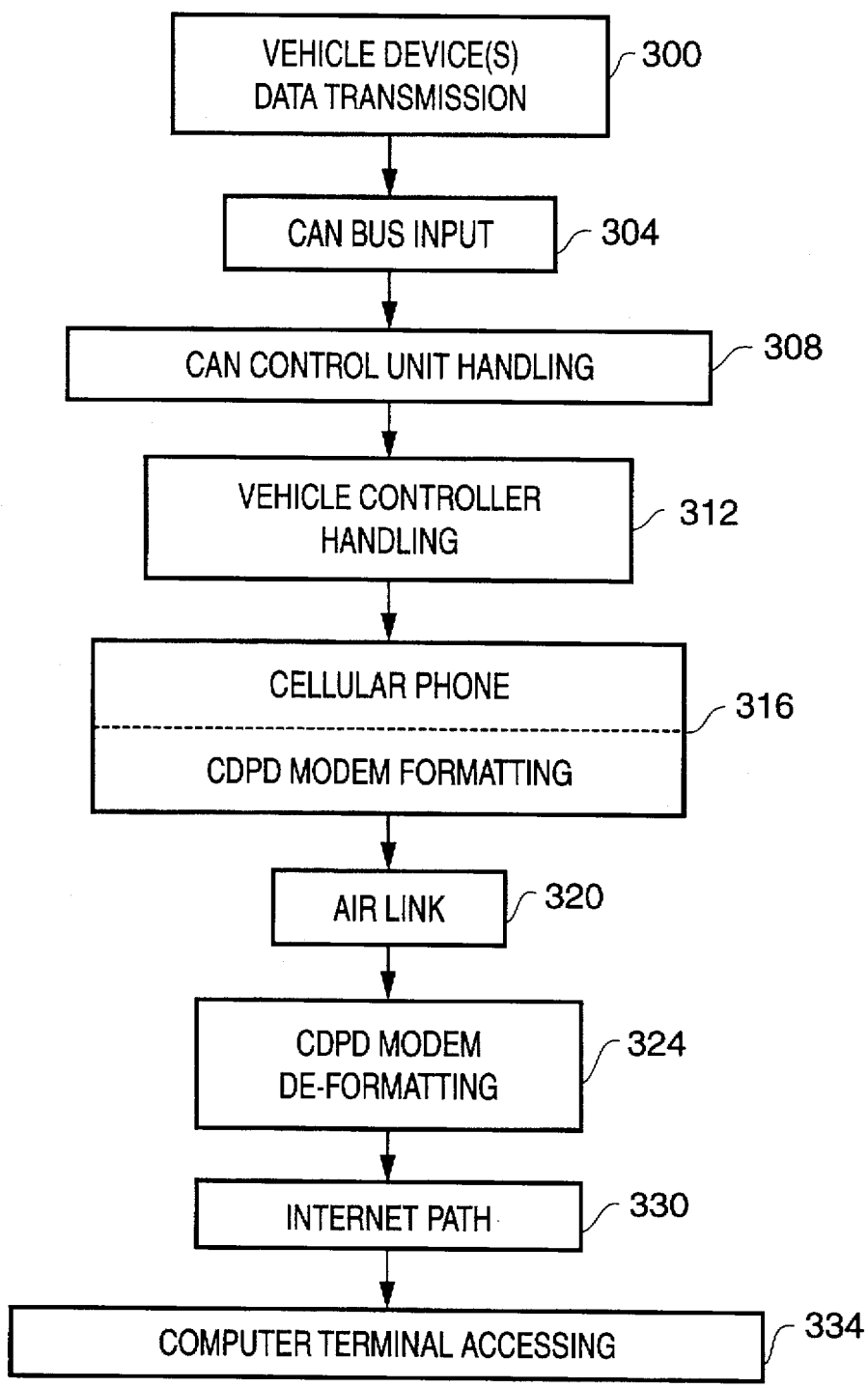
FIG. 4 is a flow diagram illustrating major steps that are involved in a communication initiated by the vehicle to a remote station.

Previous discussions of the operation of the apparatus have primarily been directed to operations in which the sending of information is initiated by a remote computer terminal 60. With reference to the flow diagram of FIG. 4, a further related description of the operation of the present invention involves a case in which information is transmitted upon initiation of the controller 30 in the vehicle. In accordance with such an operation, data or other information from one or more vehicle devices 50a-50n is provided over the airlink to one or more remote stations 10a-10n on a predetermined or determinable time basis. For example, each vehicle in a fleet of vehicles might be required to report its location on a periodic basis to a remote station 10. The steps of FIG. 4 are next described in the context of such an example. At block 300, vehicle positioning data is available from one of the vehicle devices 50, which might be a GPS. On a requested or regular input scheme, such vehicle device data is sent to the CAN bus 126 at block 304. The CAN controller 122 is responsible for controlling the receipt and transmitting of such data to the controller 30 at block 308. The vehicle data that is to be transmitted over the wire link, in accordance with the predetermined or determinable procedure, is appropriately processed, analyzed or otherwise acted on using the controller 30 at block 312. In one embodiment, vehicle device data, such as GPS data, do not rely on the web server 102 but may utilize a different communications pathway, such as E-mail. In any event, the controller 30 gates the vehicle location data to the cellular phone having the vehicle airlink transfer protocol modem 20, such as a CDPD network modem 82, at block 316. The vehicle location data is properly formatted and transmitted through the cellular phone over the airlink at block 320. In receiving such data from the airlink, a remote airlink transfer protocol modem 16, such as a remote CDPD network modem 76, collects such data at block 324 and subsequently passes the vehicle data to the Internet 68 at block 330. The desired computer terminal 60 receives the vehicle positioning data from the Internet 68 at block 334. In accordance with desired embodiments, such data can be further processed by the computer terminal 60, displayed on a display unit thereof in a pre-established way, or otherwise handled to achieved desired use of the received data. In a related variation of this embodiment, after processing such data, the computer terminal 60 may initiate further actions in the way of sending information to the vehicle for adjusting or otherwise affecting the vehicle device that provided the data for analysis. That is, based on the data received and analyzed by the computer terminal 60, a determination is made that a desired or feedback input needs to be provided in real time to this vehicle device.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments discussed herein above are further intended to explain the best mode known of practicing the invention and to enable others skilled in the art to utilize the invention in such, or in other, embodiments and with the various modifications required by their particular application or uses of the invention. It is intended that the appended claims be construed to include alternative embodiments to the extent permitted by the prior art.

What is claimed is:

1. An apparatus for information transmission involving one or more remote stations and a vehicle, comprising:

at least a first remote station including computer means located at a distance from a vehicle;

a wireless device for location in the vehicle for use in sending and receiving information including data relative to said first remote station over an airlink;

a plurality of different vehicle devices associated with the vehicle and with each of said vehicle devices for at least one of receiving and sending said information;

controller means including processing means in the vehicle for controlling the sending and receiving of said information using said wireless device between said first remote station and the vehicle, said controller means further including first standard network communication means for use in presenting information for transmission over the airlink in a first format that is acceptable to a first standardized network that includes the airlink, wherein said first network communication means enables said information to be provided to multiple users that utilize different makes of communication equipment, different processing hardware and different applications software executable by said processing means of said controller means, said first standard network communication means including a web server in the vehicle for responding to a plurality of service related requests and providing said information in said first format for transmission to said computer means at said first remote station using said wireless device; and a second standard network communication means, different from said first standard network communication means, in communication with said controller means for presenting information in a second format that is acceptable to a second standardized network, with said second standardized network communication means communicating with said vehicle devices for sending and receiving said information relative thereto and in which said controller means enables said information to be properly communicated between said first and second standardized networks.

2. An apparatus, as claimed in claim 1, wherein:

said first standard network communication means includes first means for communicating with said wireless device for receiving a request for said information obtainable from at least one of said vehicle devices, said first means including means for checking source address information associated with said request in determining that said request is to be responded to by said controller means.

3. An apparatus for information transmission involving one or more remote stations in a vehicle, comprising:

at least a first remote station including computer means located at a distance from a vehicle:

a wireless device for location in the vehicle for use in sending and receiving information including data relative to said first remote station over an airlink;

a plurality of different vehicle devices associated with the vehicle and with each of said vehicle devices for at least one of receiving and sending said information;

controller means including processing means in the vehicle for controlling the sending and receiving of said information using said wireless device between said first remote station and the vehicle, said controller means further including first standard network communication means for use in presenting said information for transmission over the airlink in a first format that is acceptable to a first standardized network that includes the airlink, wherein said first network communication means enables said information to be provided to multiple users that utilize different makes of communication equipment, different processing hardware and different applications software executable by said processing means of said controller means, said first standard network communication means including a web server in the vehicle for responding to a plurality of service related requests and also including transmission control protocol means in communication with said web server for regulating flow and ordering of said information related to said vehicle devices to said web server; and a second standard network communication means, different from said first standard network communication means, in communication with said controller means for presenting information in a second format that is acceptable to a second standardized network, with said second standardized network communication means communicating with said vehicle devices for sending and receiving said information relative thereto and in which said controller means enables said information to be properly communicated between said first and second standardized networks.

4. An apparatus for information transmission involving one or more remote stations in a vehicle, comprising:

at least a first remote station including computer means located at a distance from a vehicle;

a wireless device for location in the vehicle for use in sending and receiving said information including data relative to said first remote station over an airlink;

a plurality of different vehicle devices associated with the vehicle and with each of said vehicle devices for at least one of receiving and sending said information;

controller means including processing means in the vehicle for controlling the sending and receiving of said information using said wireless device between said first remote station and the vehicle, said controller means further including first standard network communication means for use in presenting said information for transmission over the airlink in a first format that is acceptable to a first standardized network that includes the airlink, wherein said first network communication means enables said information to be provided to multiple users that utilize different makes of communication equipment, different processing hardware and different applications software executable by said processing means of said controller means, said first standard network communication means including a web server in the vehicle for responding to a plurality of service related requests and also including a CGI-bin communicating with said web server and in which said CGI-bin links said web server with a number of executable programs useful in obtaining said information related to said vehicle devices; and a second standard network communication means, different from said first standard network communication means, in communication with said controller means for presenting information in a second format that is acceptable to a second standardized network, with said second standardized network communication means communicating with said vehicle devices for sending and receiving said information relative thereto and in which said controller means enables said information to be properly communicated between said first and second standardized networks.

5. An apparatus for information transmission involving one or more remote stations in a vehicle, comprising:

at least a first remote station including computer means located at a distance from a vehicle;

a wireless device for location in the vehicle for use in sending and receiving information including data relative to said first remote station over an airlink;

a plurality of different vehicle devices associated with the vehicle and with each of said vehicle devices for at least one of receiving and sending said information;

controller means including processing means in the vehicle for controlling the sending and receiving of said information using said wireless device between said remote station and the vehicle, said controller means further including first standard network communication means for use in presenting said information for transmission over the airlink in a first format that is acceptable to a first standardized network that includes the airlink, wherein said first network communication means enables said information to be provided to multiple users that utilize different makes of communication equipment, different processing hardware and different applications software executable by said processing means of said controller means, said first standard network communication means including a web server in the vehicle for responding to a plurality of service related requests received using said wireless device, with said web server in communication with program memory for storing said executable software in connection with obtaining said information from said vehicle devices and in which said first standard network communication means further includes an operating system for managing a number of services associated with conducting applications oriented tasks in conjunction with said executable software; and a second standard network communication means, different from said first standard network communication means in communication with said controller means for presenting information in any second format that is acceptable to a second standardized network, with said second standardized network communication means communicating with said vehicle devices for sending and receiving said information relative thereto and in which said controller means enables said information to be properly communicated between said first and second standardized networks.

6. An apparatus, as claimed in claim 1, wherein:

said first standardized network communication means includes the Internet and said second standardized network includes a bus having predetermined protocol that permits controlled communications relative to said vehicle devices and in which said executable software includes a plurality of the following: software for providing the location of the vehicle; software for providing data related to the vehicle conditions; software for providing data related to conditions of cargo contained in the vehicle; software for providing data related to medical conditions of a patient carried by the vehicle; and software for providing predetermined alarm conditions and in which said software utilizes said information from said vehicle devices.

7. An apparatus for information transmission involving one or more remote stations in a vehicle, comprising:

at least a first remote station including computer means located at a distance from a vehicle a wireless device for location in the vehicle for use in sending and receiving information including data relative to said first remote station over an airlink:

a plurality of different vehicle devices associated with the vehicle and which each of said vehicle devices for at least one of receiving and sending said information;

controller means including processing means in the vehicle for controlling the sending and receiving of said information using said wireless device between said first remote station and the vehicle, said controller means further including first standard network communication means for use in presenting said information for transmission over the airlink in a first format that is acceptable to a first standardized network that includes the airlink, wherein said first network communication means enables said information to be provided to multiple users that utilize different makes of communication equipment, different processing hardware and different applications software executable by said processing means of said controller means, said first standard network communication means including a web server in the vehicle that responds to a plurality of service related requests and provides said information in said first format and a data memory that communicates with said web server for storing data in html that is obtainable using said web server and in which said web server provides said data in said first format, with said first format being http; and a second standard network communication means, different from said first standard network communication means, in communication with said controller means for presenting said information in a second format that is acceptable to a second standardized network, with said second standardized network communication means communicating with said vehicle devices for sending and receiving said information relative thereto and in which said controller means enables said information to be properly communicated between said first and second standardized networks.

8. An apparatus as claimed in claim 1, wherein:

said controller means includes a communications port for receiving communications port information separately from said wireless device, with said communications port information being useful in providing an input to one of said plurality of vehicle devices through said second standard network communication means.

9. An apparatus, as claimed in claim 1, wherein:

each of said plurality of vehicle devices has a separate designation known to said controller means, with information being requested from a first vehicle device by said computer means by selecting a designation associated with said first vehicle device and said first vehicle device designation being acceptable to said first standardized network.

10. An apparatus, as claimed in claim 1, wherein:

said computer means includes display means and said controller means responds to a request from said computer means by controlling the sending of software to said computer means for use in displaying information on said display means, with said software being related to operation of one of said vehicle devices.

11. An apparatus, as claimed in claim 1, wherein:

said controller means initiates a transfer of information to said first remote station based on occurrence of at least one predetermined event.

12. A method for using at least a first standardized network for communicating information between a remote station and a vehicle, comprising:

providing a wireless device in the vehicle;

sending a message including a request for information and an address using a computer at the remote station;

formatting said message so that it is acceptable to the first standardized network;

configuring said message to communicate said message over an airlink;

receiving said message in the vehicle using said wireless device;

coordinating said request for information including checking for an address;

sending said request for information to a server;

obtaining information based on management by said server of said request for information, said obtained information being provided in accordance with a predetermined language arrangement, said obtaining step including accessing data memory for storing data defined in html using said server;

formatting said obtained information using said server;

transmitting said obtained information over said airlink using said wireless device; and receiving said information by said computer.

13. A method, as claimed in claim 12, wherein:

said obtaining step includes using a second standardized network that communicates with a number of vehicle devices, each of said vehicle devices for at least one of sending and receiving data and in which said data is sent in response to said request for information.

14. A method, as claimed in claim 13, further including:

initiating a signal by a first of said vehicle devices in response to detection of a first condition and in which responding to said request for information is delayed while sending data related to said first condition.

15. A method, as claimed in claim 13, wherein:

said obtaining step includes receiving said request for information separately from said wireless device using a communications port associated with controller means that communicates with said wireless device when said wireless device is not in the vehicle.

16. A method for using at least a first standardized network for communicating information between a remote station and a vehicle, comprising:

providing a wireless device in the vehicle;

sending a message including a request for information and an address using a computer at the remote station;

formatting said message so that it is acceptable to the first standardized network:

configuring said message to communicate said message over an airlink;

receiving said message in the vehicle using said wireless device;

coordinating said request for information including checking for an address;

sending said request for information to a server;

obtaining information based on management by said server of said request for information; said obtained information being provided in accordance with a predetermined language format, said obtaining step includes invoking an applications program using a CGI-bin in communication with said server and subsequently executing said applications program using processing means in the vehicle;

formatting said obtained information using said server;

transmitting said obtained information over said airlink using said wireless device; and receiving said information by said computer.

17. A method, as claimed in claim 16, wherein:

said executing step includes using data obtained from at least one of said plurality of vehicle devices.

18. A method, as claimed in claim 17, wherein:

said executing step includes using operating system software for managing a number of services associated with conducting one or more applications-oriented tasks and in which said operating system is involved in interrupting said request for information when a predetermined alarm condition is detected by a predetermined one of said vehicle devices.

19. A method, as claimed in claim 18, wherein:

said executing step includes performing multiple tasks using said operating system.

20. A method, as claimed in claim 12, further including:

initiating a transfer of information by controller means contained in the vehicle based on the occurrence of a predetermined condition.

21. A method for communicating information between a computer at a remote site and a vehicle having a plurality of vehicle devices for sending and receiving information including data, comprising:

providing a wireless device in the vehicle;

requesting data from a first of said vehicle devices using said computer;

formatting said request so that it is acceptable to a first standardized network, with said request including a first address associated with said first vehicle device, said step of formatting said request includes using a http web server and said first standardized network includes the Internet;

configuring said request to communicate said request over an airlink;

receiving said request in the vehicle using said wireless device;

managing said request including where said data is to be obtained with reliance on said first address of said first vehicle device;

obtaining said data after said managing step using a second standardized network, different from said first standardized network, said second standardized network includes a controller area network for providing communications protocol for a number of different vehicle devices;

formatting said data so that it is acceptable to said first standardized network;

transmitting said data over said airlink using said wireless device; and receiving said data associated with said first vehicle device by said computer.

* * * * *